(12) United States Patent
Bhat et al.

(10) Patent No.: US 8,516,065 B2
(45) Date of Patent: Aug. 20, 2013

(54) CRITERION-DEPENDENT EMAIL DISPLAY AGENT

(75) Inventors: Sanjay Dinkar Bhat, Flower Mound, TX (US); Brian W. Hart, Austin, TX (US); Anil Kalavakolanu, Austin, TX (US); Liang Jiang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 13/342,571

(22) Filed: Jan. 3, 2012

(65) Prior Publication Data

US 2013/0173718 A1 Jul. 4, 2013

(51) Int. Cl.
*G06F 15/16* (2006.01)
(52) U.S. Cl.
USPC .......................................... 709/206; 709/224
(58) Field of Classification Search
USPC .................... 709/200–206, 217–227
See application file for complete search history.

(56) References Cited

U.S. PATENT DOCUMENTS

| 7,883,221 | B2* | 2/2011 | Nozaki et al. | 353/122 |
|---|---|---|---|---|
| 8,147,066 | B2* | 4/2012 | Nozaki et al. | 353/30 |
| 2003/0096600 | A1 | 5/2003 | Lewis et al. | |
| 2004/0218036 | A1* | 11/2004 | Boss et al. | 348/14.08 |
| 2006/0074983 | A1 | 4/2006 | Jones | |
| 2008/0049192 | A1* | 2/2008 | Nozaki et al. | 353/25 |
| 2010/0007517 | A1* | 1/2010 | Andrews et al. | 340/825.69 |
| 2010/0042690 | A1 | 2/2010 | Wall | |
| 2010/0229246 | A1 | 9/2010 | Warrington et al. | |
| 2010/0275266 | A1 | 10/2010 | Jakobson et al. | |
| 2010/0313239 | A1 | 12/2010 | Chakra et al. | |

OTHER PUBLICATIONS

"Texting During Meetings is Definitely Noticed, Seen as Rude", lifehacker—office culture, available at http://lifehacker.com/5540578/texting-during-meetings-is-definitely-noticed-seen-as-rude, Aug. 2, 2011, 3 pgs.
Tschabitscher, Heinz, "Protect Your Privacy Against Web-Bugs and Remote Images in Yahoo! Mail", About.com Guide, available at http://email.about.com/cs/yahoomailtips/qt/et030103.htm, Aug. 2, 2011, 1 pg.
"Send Anonymous E-Mail, Anonymous Domain and Anonymous Hosting" AnonymousSpeech.com, available at https://www.anonymousspeech.com/Default.aspx, Aug. 2, 2011, 3 pgs.
Wilcox, Colin, "Hide or Remove E-Mail Message Headers", available at http://office.microsoft.com/en-us/outlook-help/hide-or-remove-e-mail-message-headers-HA001087297.aspx, Aug. 2, 2011, Microsoft Corporation, 2011 5 pgs.
"Hide Your Email Addresses", Bruceee's Sandpit Web Design with SiteSpinner, available at http://www.bruceee.com/ss/Email.html, Aug. 2, 2011, last change Nov. 29, 2007, 9 pgs.
"About Safe Express" available at http://netsafesoft.com/nss/index.htm, Aug. 2, 2011, Safe Soft Corporation 2003-2010, 2 pgs.

* cited by examiner

*Primary Examiner* — Moustafa M Meky
(74) *Attorney, Agent, or Firm* — Shumaker & Sieffert, P.A.

(57) ABSTRACT

There is set forth herein a computer program product, computing device, and method for displaying an email message. In one example, a computing device receives an input comprising at least one criterion for redacting email messages; stores the at least one criterion in a configuration of a client computer program; receives an email message having a field, the field comprising a first content; determines whether a condition of at least one of the email message and a current state of the computing device satisfies the at least one criterion stored in the configuration of the client computer program; and, in response to determining that the condition satisfies the at least one criterion, displays a second content in place of the first content in a user interface of the client computer program, wherein the second content is different than the first content.

20 Claims, 5 Drawing Sheets

CRITERION-DEPENDENT EMAIL DISPLAY AGENT

TECHNICAL FIELD

The disclosure relates to email, and more particularly, to software for managing aspects of how email is displayed.

BACKGROUND

Typically, email may be delivered through a client application or web-based application that includes a graphical user interface for displaying information about a user's email account, such as an inbox. The display for the inbox may update dynamically, so that a newly arriving email message appears at the top of a list of email messages in the display of the user's email inbox, even in the absence of a user input for a display refresh or other prompting. The email application or the operating system may also respond to the arrival of a new email message by generating a new text box, icon, or other form of notification in a display on top of or adjacent to a different application window, even when the main user interface window for the email application is minimized, behind another user interface window, or otherwise not being shown on the display.

SUMMARY

In one example, a method for displaying an email message is provided. The method includes a computing device receiving an input comprising at least one criterion for redacting email messages. The method further includes the computing device storing the at least one criterion in a configuration of a client computer program. The method further includes the computing device receiving an email message having a field. The field includes a first content. The method further includes the computing device determining whether a condition of at least one of the email message and a current state of the computing device satisfies the at least one criterion stored in the configuration of the client computer program. The method further includes the computing device, in response to determining that the condition satisfies the at least one criterion, displays a second content in place of the first content in a user interface of the client computer program. The second content is different than the first content.

In another example, a computing device for displaying an email message is provided. The computing device includes one or more computer-readable tangible storage devices, one or more processors, and one or more computer-readable memories. The computing device further includes program instructions, stored on at least one of the one or more computer-readable tangible storage devices for execution by at least one of the one or more processors via at least one of the one or more computer-readable memories, to receive an input comprising at least one criterion for redacting email messages. The computing device further includes program instructions, stored on at least one of the one or more computer-readable tangible storage devices for execution by at least one of the one or more processors via at least one of the one or more computer-readable memories, to store the at least one criterion in a configuration of a client computer program. The computing device further includes program instructions, stored on at least one of the one or more computer-readable tangible storage devices for execution by at least one of the one or more processors via at least one of the one or more computer-readable memories, to receive an email message having a field. The field includes a first content. The comput-ing device further includes program instructions, stored on at least one of the one or more computer-readable tangible storage devices for execution by at least one of the one or more processors via at least one of the one or more computer-readable memories, to determine whether a condition of at least one of the email message and a current state of the computing device satisfies the at least one criterion stored in the configuration of the client computer program. The computing device further includes program instructions, stored on at least one of the one or more computer-readable tangible storage devices for execution by at least one of the one or more processors via at least one of the one or more computer-readable memories, to, in response to determining that the condition satisfies the at least one criterion, display a second content in place of the first content in a user interface of the client computer program. The second content is different than the first content.

In another example, a computer program product for displaying an email message is provided. The computer program product includes one or more computer-readable tangible storage devices. The computer program product further includes program instructions, stored at least one of the one or more computer-readable tangible storage devices, to receive an input comprising at least one criterion for redacting email messages. The computer program product further includes program instructions, stored at least one of the one or more computer-readable tangible storage devices, to store the at least one criterion in a configuration of a client computer program. The computer program product further includes program instructions, stored at least one of the one or more computer-readable tangible storage devices, to receive an email message having a field. The field includes a first content. The computer program product further includes program instructions, stored at least one of the one or more computer-readable tangible storage devices, to determine whether a condition of at least one of the email message and a current state of a computing device satisfies the at least one criterion stored in the configuration of the client computer program. The computer program product further includes program instructions, stored at least one of the one or more computer-readable tangible storage devices, to, in response to determining that the condition satisfies the at least one criterion, display a second content in place of the first content in a user interface of the client computer program. The second content is different than the first content.

The details of one or more embodiments are set forth in the accompanying drawings and the description below. Other features, objects, and advantages will be apparent from the description and drawings, and from the claims.

DETAILED DESCRIPTION

There is set forth herein a method, computing device, and computer program product for use displaying an email message. A criterion-dependent email display agent evaluates incoming email messages against a variety of criteria, and imposes privacy actions on the display of the email messages in the display output of a computing device, among various other advantages. For example, if a person is giving a presentation and has a computing device connected to a projector, the email agent can prevent a notification box from popping up in the display projection, thereby preventing distraction to both the presenter and the audience. As another example, if the presenter intentionally opens her email application during the presentation to access content in the email application to share with the audience, the email agent can mask or obscure certain fields of content in the user interface displayed for the email application, such as sender email address fields or subject fields of emails in an inbox, to prevent breaches of private or confidential information. These and other illustrative examples are described and depicted in further detail in the figures and the accompanying description below.

Figure 1:
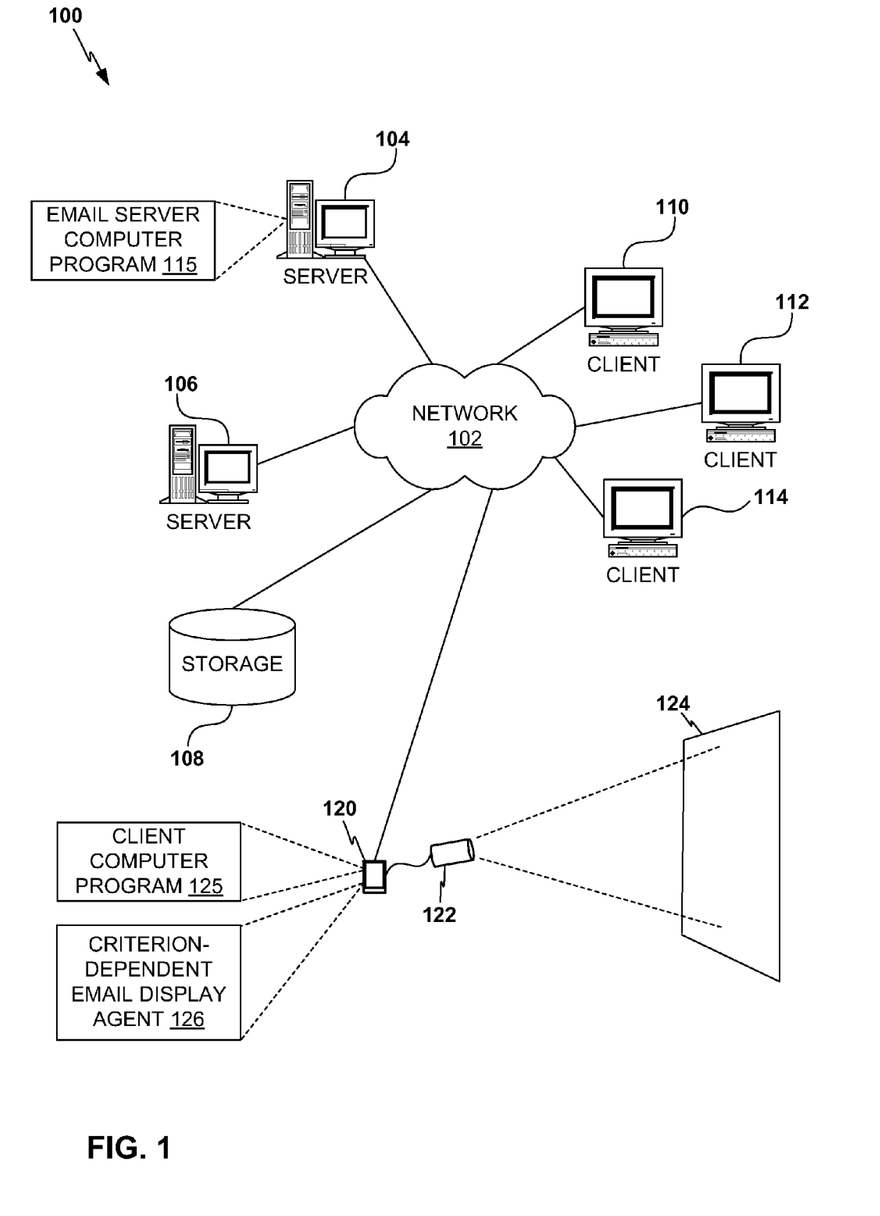
FIG. 1 depicts a simplified representation of a network of computer systems in which embodiments of a criterion-dependent email display agent may be implemented.

FIG. 1 depicts a simplified representation of a network of computer systems in which embodiments of a criterion-dependent email display agent may be implemented. Network computer system 100 is a network of computers in which various email agent embodiments may be implemented. Network computer system 100 includes network 102, that may include one or more networks of any kind that may provide communications links between various devices and computers connected together within network computer system 100. Network 102 may include connections, such as wire, wireless communication links, or fiber optic cables.

In the depicted example, server 104 and server 106 connect to network 102 along with storage unit 108. Servers 104 and 106 may include any type of servers, and storage unit 108 may include any type of storage device, storage server, storage area network, redundant array of independent discs (RAID), cloud storage service, or any other type of data storage. Server 104 includes email server computer program 115, which delivers email messages to clients 110, 112, and 114 and tablet computer 120. Clients 110, 112, and 114, and tablet computer 120, connect to network 102. Clients 110, 112, and 114 may be, for example, personal computers or network computers. In the depicted example, server 104 provides data, such as boot files, operating system images, and applications to clients 110, 112, and 114, and tablet computer 120. Clients 110, 112, and 114, and tablet computer 120, are clients to server 104 in this example. Network computer system 100 may include additional servers, clients, and other devices not shown.

Tablet computer 120 is an illustrative example of a computing device, which may also take the form of a laptop or desktop computer, a smartphone, or any other type of computing device. Tablet computer 120 has a projector 122 connected to it as an illustrative example of a video output device. Projector 122 projects a video output display image on projection screen 124. In this context, a user may use tablet computer 120 and projector 122 as part of a presentation to an audience of one or more other people. Tablet computer 120 may include a client computer program 125 and a criterion-dependent email display agent 126. Client computer program 125 may be a web browser, a standalone email client application, or part of a separate service that monitors and interacts with a web browser or standalone email client application. Client computer program 125 may receive incoming email messages from email server computer program 115. Criterion-dependent email display agent 126 may evaluate the incoming email messages against a variety of criteria, and may impose privacy actions on a display of the email messages in the display output of tablet computer 120. While in FIG. 1, client computer program 125 and criterion-dependent email display agent 126 are depicted as separate computer programs, one of skill in the art will appreciate that in other embodiments, client computer program 125 and criterion-dependent email display agent 126 can be parts of a single computer program.

In the depicted example, network computer system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network computer system 100 also may be implemented as a number of different types of networks, such as for example, an intranet, a local area network (LAN), or a wide area network (WAN). FIG. 1 is an illustrative example, and not an architectural limitation for the variety of illustrative examples.

Figure 2:
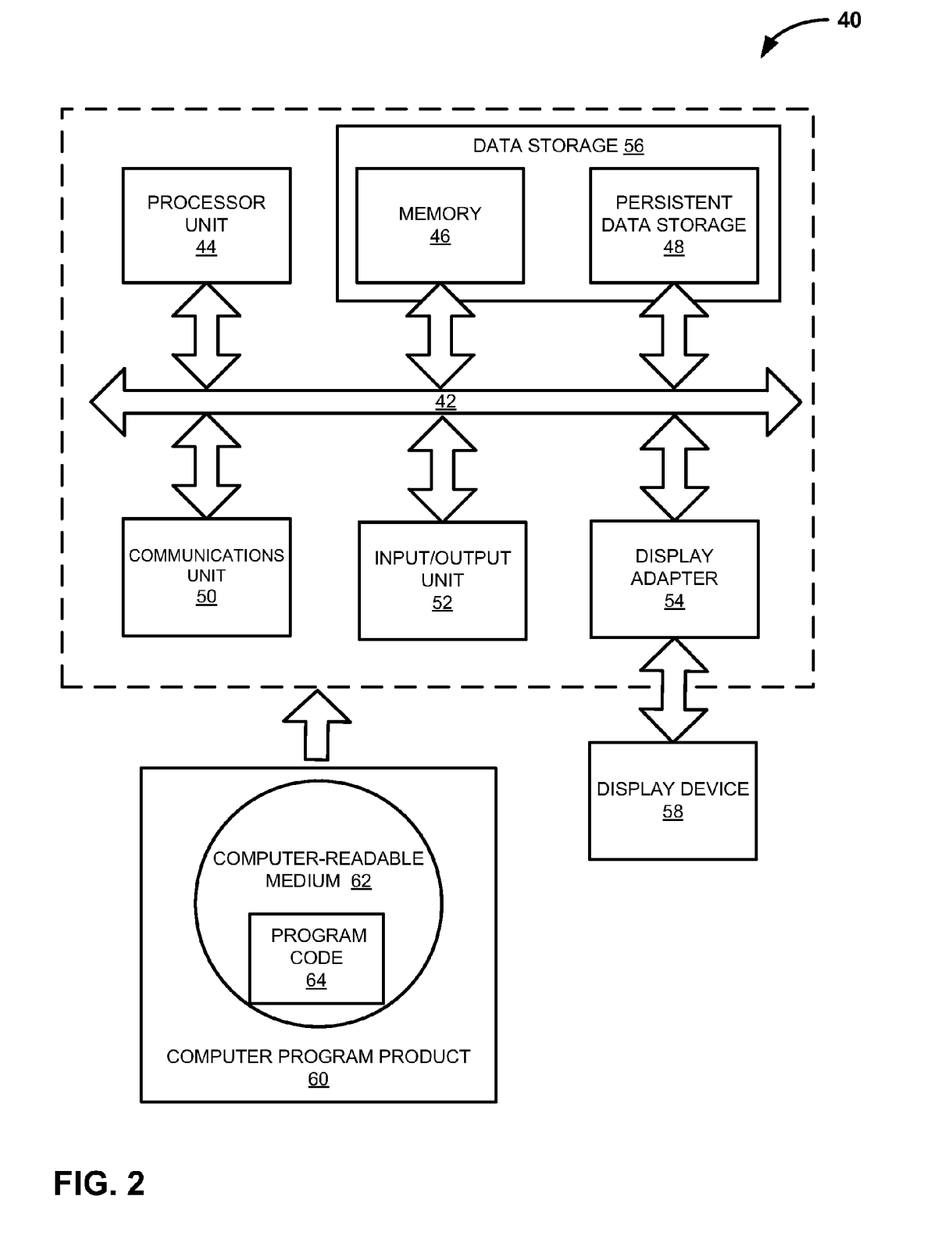
FIG. 2 depicts a simplified block diagram of an illustrative computing device suitable for implementing examples of a criterion-dependent email display agent.

FIG. 2 depicts a simplified block diagram of an illustrative computing device 40 suitable for implementing examples of a criterion-dependent email display agent. Computing device 40 can be a tablet computer, smartphone, notebook or laptop computer, desktop computer, workstation, server, mainframe computer, or other programmable data processing apparatus. Other possibilities for computing device 40 are possible, including a computer having capabilities other than or beyond those described herein.

In this illustrative example, computing device 40 includes communications fabric 42, which provides communications between processor unit 44, memory 46, persistent data storage 48, communications unit 50, input/output (I/O) unit 52, and display adapter 54. Communications fabric 42 may include a general system bus, one or more peripheral buses, multiple buses arranged in hierarchical form, any other type of bus, bus network, host bus adapters, switch fabric, or other interconnection technology. Communications fabric 42 can support transfer of data, commands, and other information between various subsystems of computing device 40.

Processor unit 44 may be a programmable central processing unit (CPU) configured for executing programmed instructions stored in memory 46. Further, processor unit 204 may be implemented using one or more heterogeneous processor systems in which a main processor is present with secondary processors on a single chip. As another illustrative example, processor unit 204 may be a symmetric multi-processor system containing multiple processors of the same type. Processor unit 44 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices®, or any other suitable processor. In various examples, processor unit 44 may comprise a multi-core processor, such as a dual core or quad core processor, for example. In various examples, processor unit 44 may comprise one or more CPUs distributed across one or more locations. Processor unit 44 may also comprise one or more field-programmable gate arrays (FPGAs), graphics processing units (GPUs), programmable logic devices (PLUs), application-specific integrated circuits (ASICs), or any other kind of processing component.

Data storage 56 includes memory 46 and persistent data storage 48, which are in communication with processor unit 44 through communications fabric 42. Memory 46 can include a random access semiconductor memory (RAM) for storing application data for processing. Memory 46 is depicted conceptually as a single monolithic entity. However, in various examples, memory 46 may be arranged in a hierarchy of caches and in other memory devices, in a single physical location, or distributed across a plurality of physical systems in various forms. While memory 46 is depicted physically separated from processor unit 44 and other elements of computing device 40, memory 46 may refer equivalently to any intermediate or cache memory at any location throughout computing device 40, such as level cache proximate to or integrated with processor unit 44 or individual cores of processor unit 44.

Persistent data storage 48 may include one or more hard disc drives, solid state drives, flash drives, rewritable optical disc drives, magnetic tape drives, or any combination of these or other data storage media. Persistent data storage 48 may store computer-executable instructions or computer-readable program code for an operating system, program code 64, application files comprising program code, data structures or data files, and any other type of data. These computer-executable instructions may be loaded from persistent data storage 48 onto memory 46 to be read and executed by processor unit 44 or other processors. Persistent data storage 48 and memory 46 are examples of physical, tangible computer-readable data storage devices. Data storage 56 may also include any other hardware elements capable of storing information, such as, for example and without limitation, data, program code in functional form, and/or other suitable information, either on a temporary basis and/or a permanent basis.

The operating system may provide functions such as device interface management, memory management, and multiple task management. The operating system can be a Unix based operating system such as the AIX® operating system from IBM®, a non-Unix based operating system such as the Windows® family of operating systems from Microsoft®, a network operating system such as JavaOS® from Sun Microsystems®, a mobile device operating system such as iOS® from Apple®, or any other suitable operating system. Processor unit 44 can be suitably programmed to read, load, and execute instructions of the operating system. Processor unit 44 can also be suitably programmed to read, load, and execute instructions for an email application and for a criterion-dependent email display agent, such as criterion-dependent email display agent 126 depicted in FIG. 1, as described in greater detail below.

Communications unit 50, in this example, provides for communications with other computing or communications systems or devices. Communications unit 50 may provide communications through the use of physical and/or wireless communications links. Communications unit 50 may include a network interface card for interfacing with a LAN, an Ethernet adapter, a Token Ring adapter, a modem for connecting to a transmission system such as a telephone line, or any other type of communication interface. Communications unit 50 can be used for operationally connecting many types of peripheral computing devices to computing device 40, such as printers, bus adapters, and other computers. Communications unit 50 may be implemented as an expansion card or be built into a motherboard, for example.

The input/output unit 52 can support devices suited for input and output of data with other devices that may be connected to computing device 40, such as keyboard, a mouse or other graphical pointer, a touchscreen interface, an interface for a printer or any other peripheral device, a removable magnetic or optical disc drive (including CD-ROM or DVD-ROM), a universal serial bus (USB) receptacle, or any other type of input and/or output device. Input/output unit 52 may also include a video display interface, such as a video graphics array (VGA) socket, or any other interface for video output in any type of video output protocol and any type of monitor or other video display technology, in various examples.

Computing device 40 also includes a display adapter 54 in this illustrative example, which provides one or more connections for a display device 58, which may include any of a variety of types of display devices. It will be understood that some of these examples may overlap with example components of communications unit 50 or input/output unit 52. Input/output unit 52 may also include appropriate device drivers for any type of external device, or such device drivers may reside elsewhere on computing device 40 as appropriate. Display adapter 54 may include one or more video cards, one or more graphics processing units (GPUs), one or more video-capable connection ports such as a Universal Serial Bus (USB) connector, a High-Definition Multimedia Interface (HDMI) connector, a Digital Visual Interface (DVI) connector, a Video Graphics Array (VGA) connector, or any other type of data connector capable of communicating video data, in various examples. Display device 58 may be a projector such as projector 122 depicted in FIG. 1. Display device 58 may also be any other kind of video display device, such as a monitor or a television, in various examples.

Input/output unit 52 may include a drive, socket, or outlet for receiving computer program product 60, which comprises a computer-readable medium 62 having computer program code 64 stored thereon. For example, computer program product 60 may be a CD-ROM, a DVD-ROM, a Blu-Ray disc, a magnetic disc, a USB stick, a flash drive, or an external hard disc drive, as illustrative examples, or any other suitable data storage technology. Program code 64 may be, for example, program code of a criterion-dependent email display agent according to illustrative embodiments described herein, such as criterion-dependent email display agent 126 depicted in FIG. 1.

Computer-readable medium 62 may include any type of optical, magnetic, or other physical medium that physically encodes program code 64 as a binary series of different physical states in each unit of memory that, when read by computing device 40, induces a physical signal that is read by processor unit 44 that corresponds to the physical states of the storage medium 62, and that induces corresponding changes in the physical state of processor unit 44. That physical program code signal may be modeled or conceptualized as computer-readable instructions at any of various levels of abstraction, such as a high-level programming language, assembly language, or machine language, but ultimately constitutes a series of physical electrical and/or magnetic structural interactions that physically induce a change in the physical state of processor unit 44, thereby physically causing processor unit 44 to generate physical outputs in accordance with the computer-executable instructions, in a way that causes computing device 40 to physically assume new capabilities that it did not have until its physical state was changed by loading the executable instructions comprised in program code 64.

In some illustrative examples, program code 64 may be downloaded over a network to persistent storage 48 from another device or computer system for use within computing device 40. Program code 64 comprising computer-executable instructions may be communicated or transferred to computing device 40 from computer-readable medium 62 through a hard-line or wireless communications link to communications unit 50 and/or through a connection to input/output unit 52. Computer-readable medium 62 comprising program code 64 may be located at a separate or remote location from computing device 40, and may be located anywhere, including at any remote geographical location anywhere in the world, and may relay program code 64 to computing device 40 over any type of one or more communication links, such as the Internet and/or other packet data networks. The program code 64 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include physical and/or wireless connections in various illustrative examples, and program code 64 may be transmitted from a source computer-readable medium 62 over non-tangible media, such as communications links or wireless transmissions containing the program code 64. Program code 64 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 40.

Figure 3:
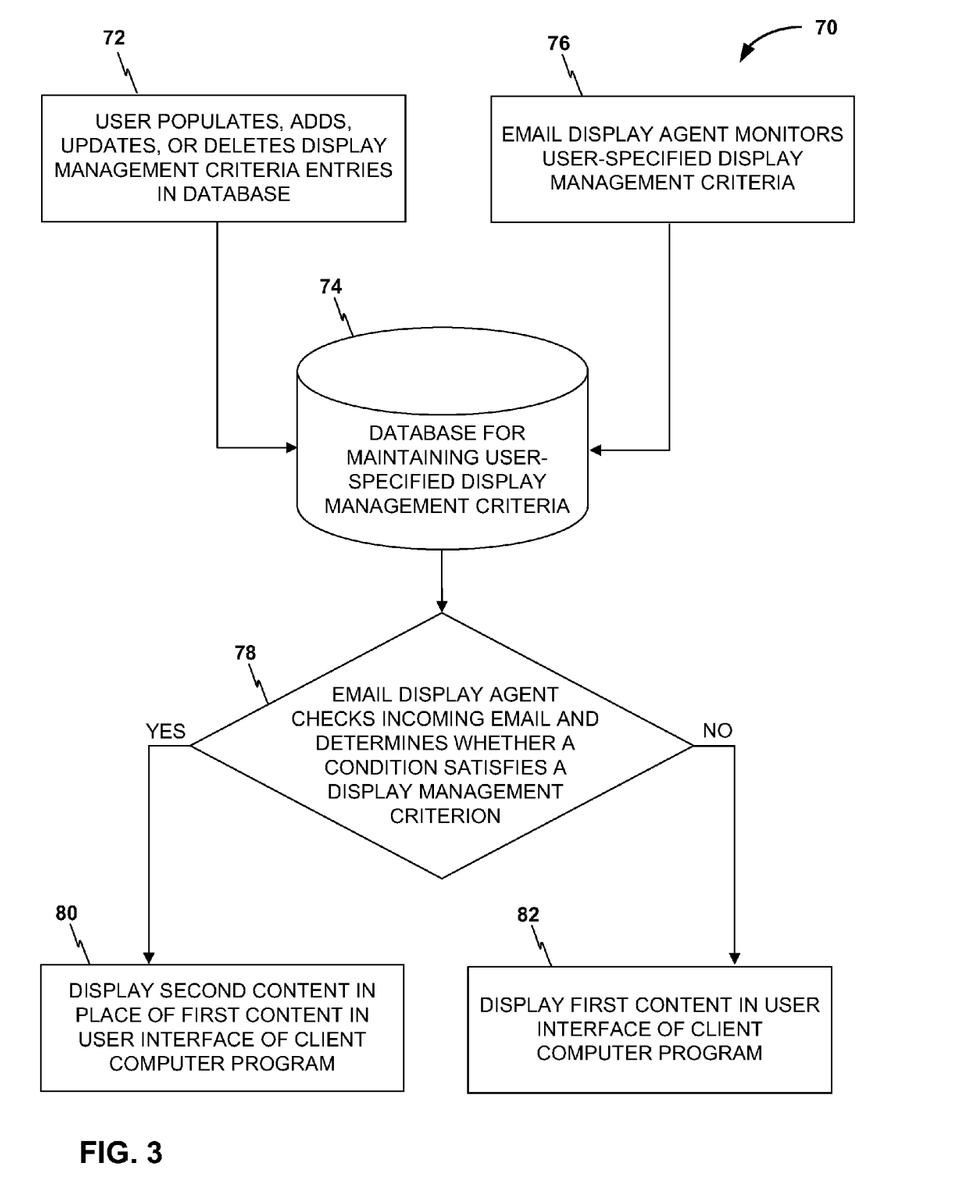
FIG. 3 depicts a flowchart for embodying or executing a method for making use of a criterion-dependent email display agent, according to an illustrative example.

FIG. 3 depicts a flowchart for embodying or executing a method 70 for making use of a criterion-dependent email display agent, according to an illustrative example. A user may populate, add, update, or delete entries for one or more display management criteria into a database 74 or other type of data store for a criterion-dependent email display agent (i.e., email display agent), such as criterion-dependent email display agent 126 depicted in FIG. 1 (72). The database 74 maintains the user-specified display management criteria for the email display agent, which may be applicable to user names, aliasing information, sender names, subject line content, mouse activity, or any of a variety of other criteria, which are further described below. A criterion-dependent email display agent (i.e., email display agent) monitors the user-specified criteria, and stores the criteria in a configuration of a client computer program, such as client computer program 125 depicted in FIG. 1 (76). The client computer program or parts thereof may execute on the user's computing device, on an email server computer such as server 104 depicted in FIG. 1, on a remote server computer separate from both the user's computing device and an email server computer, or at any other location. The criterion-dependent email display agent or any module or portion thereof may reside either on the user's computing device, on an email server computer such as server 104 depicted in FIG. 1, or on a remote server computer separate from the email server computer, and may store or coordinate criterion data on any of these locations.

In examples where the criterion-dependent email display agent is in a separate computer program than the client computer program, the criterion-dependent email display agent may interact with the client computer program through the client computer program's graphics application protocol interface (API), for example, to alter the graphics of the client computer program user interface in the relevant email message fields, in one example. In examples where the criterion-dependent email display agent is integrated as part of the client computer program, the criterion-dependent email display agent may alter the graphics of the portion of the client computer program user interface for the relevant fields of the email messages after or as part of the original generation of the graphics in the client computer program, for example.

The criterion-dependent email display agent may check incoming email messages and determine whether a condition of at least one of the email message and a current state of the computing device satisfies a display management criterion stored in the configuration (78). If the email display agent determines that the condition satisfies the criterion stored in the configuration, the email display agent responds by displaying a second content, such as a clear space or an alias, in place of a first content, such as a sender email address or a subject line content in a user interface of the client computer program (e.g., the second content is different than the first, original content) (80). If the email display agent determines that the condition does not satisfy the criterion stored in the configuration, it responds by displaying the first content in the user interface of the client computer program (82).

Figure 4:
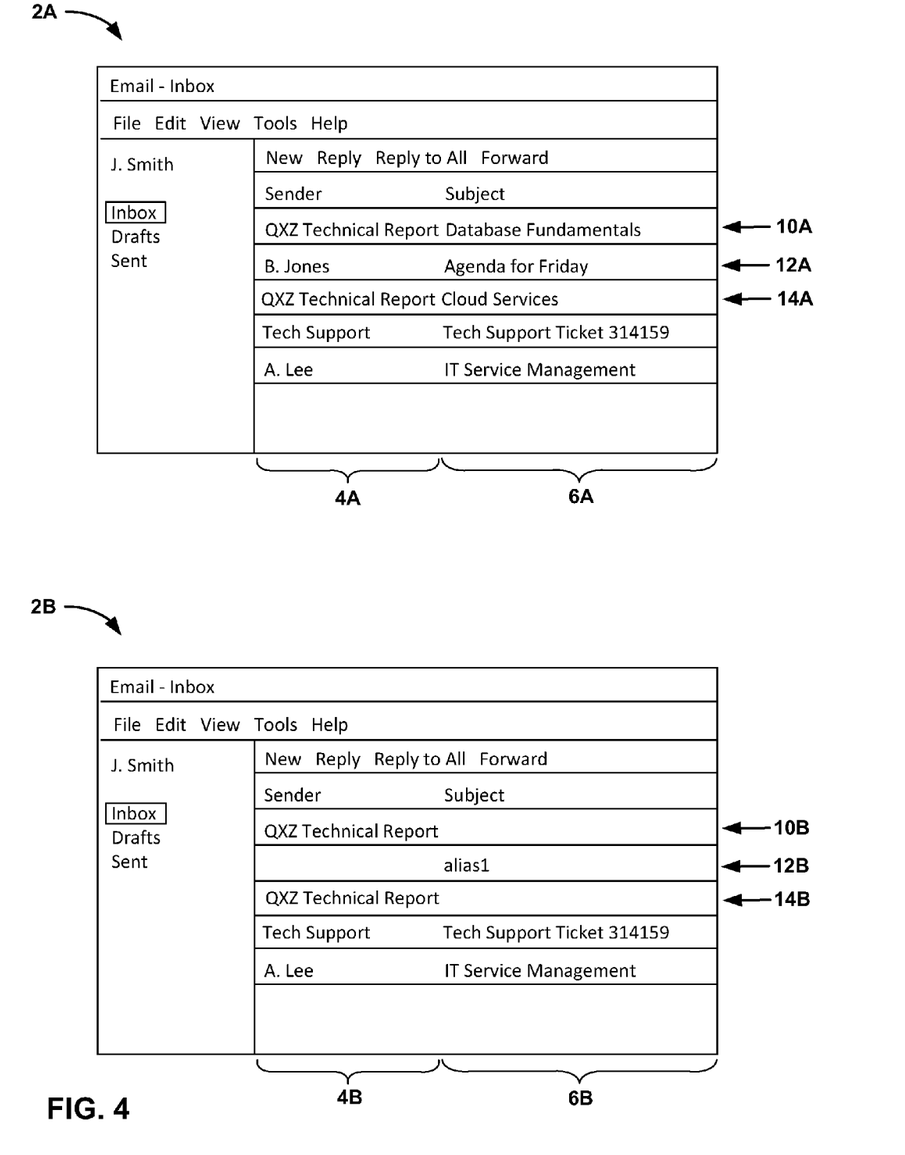
FIG. 4 depicts two screenshots of a user interface of a client computer program, according to an illustrative example.

FIG. 4 depicts two screenshots 2A and 2B of a user interface of a client computer program, according to an illustrative example. The user interface may be a user interface of client computer program 125 running on tablet computer 120 of FIG. 1 or more generally on any computing device such as computing device 40 as shown in FIG. 2, according to various illustrative examples. Screenshot 2A depicts the user interface without any modification by a criterion-dependent email display agent, such as criterion-dependent email display agent 126 depicted in FIG. 1, and displays a number of email messages including email messages 10A, 12A, 14A, with sender names in column 4A and subject lines in column 6A. Screenshot 2B depicts the same user interface in the same state except that it is modified by a criterion-dependent email display agent, such as criterion-dependent email display agent 126 depicted in FIG. 1. As shown in screenshot 2B, the user interface now displays a number of email messages including email messages 10B, 12B, 14B, with sender names in column 4B and subject lines in column 6B. In particular, the criterion-dependent email display agent has masked or replaced the content displayed for the sender name in email message 12B, as well as the subject lines of each of email messages 10B, 12B, and 14B, due to the criterion-dependent email display agent evaluating that some condition of these email messages, and/or some other condition of a current state of the computing device on which the client computer program is running, satisfies at least one criterion stored in the configuration for masking, obscuring, or otherwise modifying the display of these email messages.

While these two states of the user interface are both shown, the criterion-dependent email display agent may interrupt the normal display of the user interface as shown in screenshot 2A and modify it into the form shown in screenshot 2B before the sender names and subject lines ever have a chance of being displayed. So, the difference between screenshots 2A and 2B doesn't depict a time-ordered sequence of states, but rather two different states as two different outcomes of what is displayed without and with the operation of the criterion-dependent email display agent.

As noted, the criterion-dependent email display agent may evaluate a condition of an email message, and/or some other condition of a current state of the computing device on which the client computer program is running, to see if either a single condition or a combination of conditions satisfies at least one criterion. As an example, a criterion may be set up to evaluate the sender name and subject line of an email message, and also a video output of the computing device being operatively connected to a display device, such as projector 122 in FIG. 1, for example. This can automatically prevent certain email messages from being displayed on a projector display when the user has the client computer program open during a presentation, for example.

For instance, one criterion may include that an incoming email message have a sender name of "QXZ Technical Report", and that the computing device be operatively connected to a projector. This criterion may be stored with an associated response of obscuring the subject line of that email message. Thus, as shown in screenshot 2B, the subject lines are obscured for email messages 10B and 14B, from the sender name "QXZ Technical Report". As another example, another criterion may include that an incoming email message have a subject line that includes the string "Agenda for Friday", or the term "agenda" anywhere in the subject line, and that the computing device be operatively connected to a projector. This criterion may be stored with an associated response of obscuring the sender name of that email message, and replacing its subject line with a substitute text string, here represented by the term "alias1". Thus, as also shown in screenshot 2B, the sender name is obscured and the subject line is masked with the term "alias1" for email message 12B.

Figure 5:
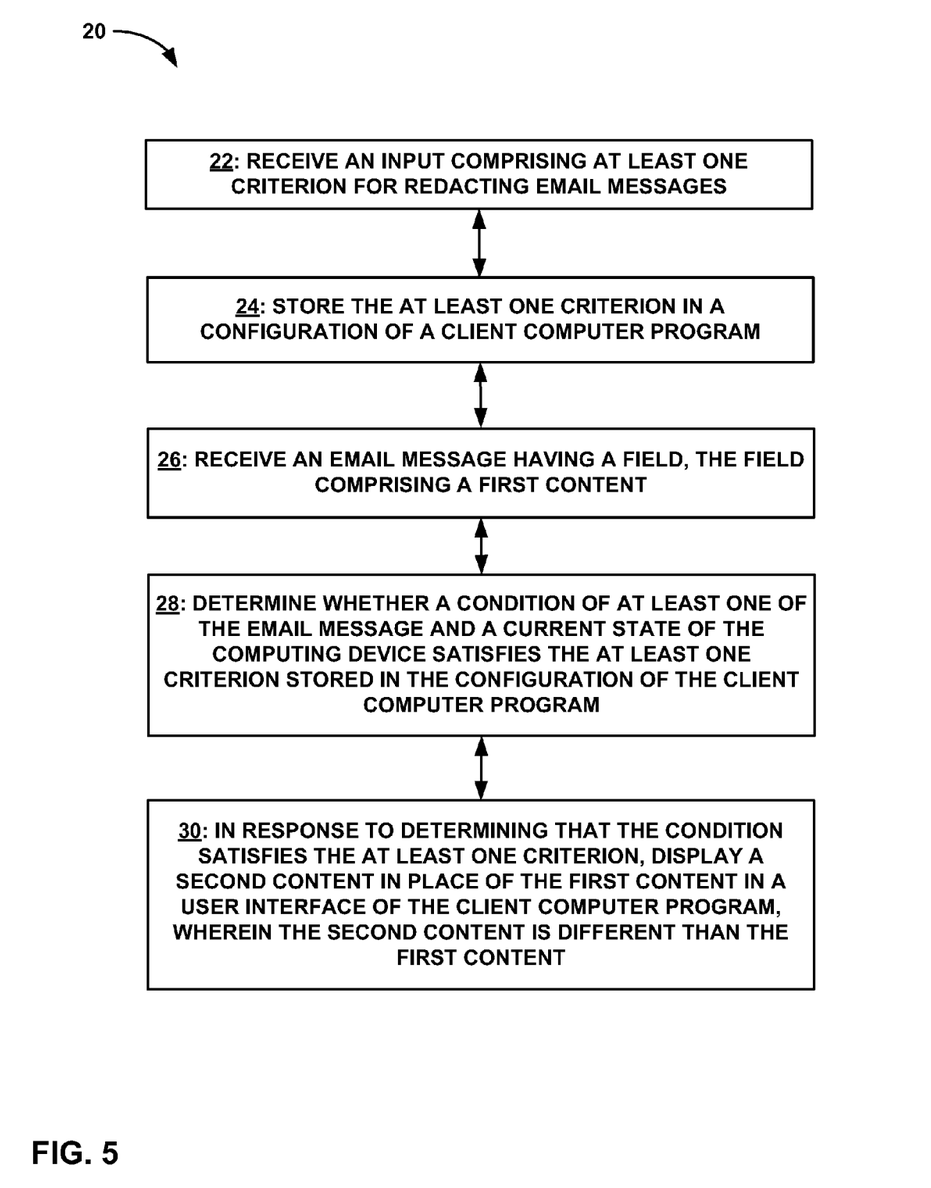
FIG. 5 is a flowchart illustrating operation of a method of operation of a criterion-dependent email display agent, according to an illustrative example.

FIG. 5 is a flowchart illustrating operation of a method 20 of operation of a criterion-dependent email display agent, according to an illustrative example. The criterion-dependent email display agent may be, for example, criterion-dependent email display agent 126 depicted in FIG. 1. In the example of method 20, the criterion-dependent email display agent receives an input comprising at least one criterion for redacting email messages (22). The criterion-dependent email display agent stores the at least one criterion in a configuration of a client computer program, such as client computer program 125 depicted in FIG. 1 (24). The criterion-dependent email display agent receives an email message having a field, the field comprising a first content (26). The criterion-dependent email display agent determines whether a condition of at least one of the email message and a current state of the computing device satisfies the at least one criterion stored in the configuration (28). The criterion-dependent email display agent, in response to determining that the condition satisfies the at least one criterion, displays a second content in place of the first content in a user interface of the client computer program, wherein the second content is different than the first content (30).

The criterion may include a video output of the computing device being operatively connected to a display device, such as a video projector or a television, for example. This may generally impose email display management safeguards in general circumstances when the user is displaying content from the computing device to other people via the display device, rather than just using the computing device for personal use.

The criterion may include the computing device being operatively connected to a first network domain to which the display device is also connected, and the computing device also being operatively connected to a second network domain, wherein the computing device receives the email message through the second network domain. In particular, the user's computing device may maintain a wireless Internet connection through a service provider network, and then also establish a wireless LAN connection with an enterprise intranet, such as when the user is visiting the enterprise to give a presentation to an audience from the enterprise, for example.

The criterion may include a current time coinciding with a block of time scheduled for an event as indicated by a calendar computer program. This may provide a direct way of detecting that the user is in a meeting or presentation during a certain block of time, and therefore that the user's computing device may be used to display material to an audience during the meeting or presentation, and this is an appropriate time to impose the email display management safeguards.

In another example, the computing device may receive an email message by accessing an email computer program in association with an email user account, and the computing device accesses a calendar computer program in association with a calendar user account that is also associated with the email user account. This may be the case in any of a variety of applications or services that either natively bundle an email application or feature with a calendar application or feature, or when the two applications are from independent sources but nevertheless include a feature that allows a user to tie the calendar application to an email account, and which may or may not provide some form of automatic syncing between the two. The criterion may therefore include a condition that depends on a link between an email account and an account in a calendar application, so that the criterion-dependent email display agent considers meetings or presentations scheduled in the calendar application to evaluate whether a criterion is met to modify the display of email messages in a user interface of the client computer program.

In another example, the criterion may include the computing device being assigned an address from a network. In another example, the criterion may include a graphical pointer, such as a mouse pointer, hovering over the email message in a display. This may include when an initial criterion has been satisfied for masking or obscuring a field in the email message display, but a subsequent criterion that is based on the hovering of the graphical pointer allows for the email message to be modified again to reveal the original content of the masked or obscured fields. This may be useful when the user temporarily does want to reveal information in the email message display, such as if the user is setting up the computing device for a presentation and has a projector connected to it, but the presentation has not yet begun and the user is still alone with the computing device, and would like to check the email messages before the presentation. The criterion may also include an input device having been actuated, such as a projector remote control being activated, for example.

In another example, the criterion may include the email message comprising a delivery flag. This may be a delivery flag having an "urgent" label, a "personal" label, a "confidential" label, or an "invitation" label that has an associated proposed meeting in a calendar computer program, any of which may be selected by the sender. The delivery flags may also have different colors, and the criterion may be based on colors of the delivery flags. In another example, the criterion may include the email message comprising a content comprised in one or more of a sender name, a sender domain, or a subject line, as discussed above.

A wide variety of other examples may include more than one criterion in combination with each other, where any combination of criteria may be assigned its own operation in response to that combination of criteria. For example, a criterion or set of criteria may include any combination of at least two or more of: a video output of the computing device being operatively connected to a output device; a date and time the email message is received; the email message comprising a delivery flag that includes one of an "urgent" label, a "personal" label, a "confidential" label, or an "invitation" label that has an associated proposed meeting in a calendar computer program; and the email message comprising a content comprised in one or more of a sender name, a sender domain, or a subject line.

The sender names may also be automatically populated, such as from data that represents an organization chart of a corporation or other type of enterprise, and which maintains data that associates email addresses or accounts with user accounts by position in the organization chart. For example, the criterion-dependent email display agent may automatically populate the criteria with sender names for everyone in the organization chart with a rank of vice president or higher, or for everyone in the legal department of the enterprise, for example. This may also be combined with a criterion such as whether a projector is connected to the computing device, so that any email messages from a senior executive or from someone in the legal department that arrive when the projector is connected will be obscured, for example.

As will be appreciated by one skilled in the art, aspects of the present invention may be embodied as a device, a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to radio frequency (RF) or other wireless, wireline, optical fiber cable, etc., or any suitable combination of the foregoing.

Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute entirely on the user's computer, partly on the user's computer, partly or entirely on a wireless user interface device, partly or entirely on the user's smartphone or tablet, as a stand-alone software package, partly on the user's computer and partly on a remote computer, or entirely on one or more remote computers or servers, among various examples. In the latter scenario, the remote computer may be connected to the user's computer through any type of network, including a local area network (LAN) or a wide area network (WAN), or the connection may be made to an external computer (for example, through the Internet using an Internet Service Provider).

For example, in various illustrative embodiments, various software applications, modules, or other software elements may be executed in connection with a browser or a dedicated application graphical user interface being executed on a wireless-enabled client computing device, such as a smartphone or a tablet or laptop computer, that may also interact with one or more web server applications that may be running on one or more server devices and may be executing or accessing other software applications, modules, databases, data stores, or other software elements or data structures. A browser or a dedicated application graphical user interface may be executed on a client computing device and may access web applications from the one or more web server applications, for example. Various content within the browser or dedicated application graphical user interface may be rendered or executed in or in association with the web browser using any release version of HTML, CSS, JavaScript, XML, AJAX, JSON, and various other languages or technologies, while other content may be provided by software applications, modules, or other elements executed on the one or more web servers and written in any programming language and/or using or accessing any software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The description of the present disclosure has been presented for purposes of illustration and description, and is not intended to be exhaustive or limited to the disclosure in the form disclosed. Many modifications and variations will be understood by those of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method for displaying an email message, the method comprising:
    a computing device receiving an input comprising at least one criterion for redacting email messages;
    the computing device storing the at least one criterion in a configuration of a client computer program;
    the computing device receiving an email message having a field, the field comprising a first content;
    the computing device determining whether a condition of at least one of the email message and a current state of the computing device satisfies the at least one criterion stored in the configuration of the client computer program; and
    in response to the computing device determining that the condition satisfies the at least one criterion, the computing device displaying a second content in place of the first content in a user interface of the client computer program, wherein the second content is different than the first content.

2. The method of claim 1, wherein the at least one criterion comprises a criterion that a video output of the computing device is operatively connected to a display device.

3. The method of claim 2, wherein the display device comprises a video projector.

4. The method of claim 2, wherein the at least one criterion further comprises:
    a criterion that the computing device is operatively connected to a first network domain to which the display device is also operatively connected; and
    a criterion that the computing device is also operatively connected to a second network domain;
    wherein the computing device receiving the email message comprises the computing device receiving the email message by way of the second network domain.

5. The method of claim 1, wherein:
    the computing device determining whether the condition satisfies the at least one criterion stored in the configuration comprises the computing device accessing a calendar computer program; and
    wherein the at least one criterion comprises a criterion that a current time coincides with a block of time scheduled for an event as indicated by the calendar computer program.

6. The method of claim 5, wherein:
    the computing device receiving the email message comprises the computing device accessing an email computer program in association with an email user account; and
    the computing device accessing the calendar computer program comprises accessing the calendar computer program in association with a calendar user account that is associated with the email user account.

7. The method of claim 1, wherein the at least one criterion comprises a criterion that the computing device is assigned an address from a particular network.

8. The method of claim 1, wherein the at least one criterion comprises a criterion that a graphical pointer is hovering over the email message in a display.

9. The method of claim 1, wherein the at least one criterion comprises a criterion that an input device has been actuated.

10. The method of claim 1, wherein the at least one criterion comprises a criterion that the email message includes a delivery flag.

11. The method of claim 10, wherein the delivery flag comprises one of an "urgent" label, a "personal" label, a "confidential" label, or an "invitation" label that has an associated proposed meeting in a calendar computer program.

12. The method of claim 1, wherein the at least one criterion comprises a criterion that the email message comprises a content containing one or more of a sender name, a sender domain, and a subject line.

13. The method of claim 1, wherein the at least one criterion comprises two or more criteria of: a video output of the computing device being operatively connected to a display device; a date and time the email message is received; the email message comprising a delivery flag that comprises one of an "urgent" label, a "personal" label, a "confidential" label, or an "invitation" label that has an associated proposed meeting in a calendar computer program; and wherein the email message comprises a content comprised in one or more of a sender name, a sender domain, and a subject line.

14. A computing device for displaying an email message, the computing device comprising:
one or more computer-readable tangible storage devices, one or more processors, and one or more computer-readable memories;
program instructions, stored on at least one of the one or more computer-readable tangible storage devices for execution by at least one of the one or more processors via at least one of the one or more computer-readable memories, to receive an input comprising at least one criterion for redacting email messages;
program instructions, stored on at least one of the one or more computer-readable tangible storage devices for execution by at least one of the one or more processors via at least one of the one or more computer-readable memories, to store the at least one criterion in a configuration of a client computer program;
program instructions, stored on at least one of the one or more computer-readable tangible storage devices for execution by at least one of the one or more processors via at least one of the one or more computer-readable memories, to receive an email message having a field, the field comprising a first content;
program instructions, stored on at least one of the one or more computer-readable tangible storage devices for execution by at least one of the one or more processors via at least one of the one or more computer-readable memories, to determine whether a condition of at least one of the email message and a current state of the computing device satisfies the at least one criterion stored in the configuration of the client computer program; and
program instructions, stored on at least one of the one or more computer-readable tangible storage devices for execution by at least one of the one or more processors via at least one of the one or more computer-readable memories, to, in response to determining that the condition satisfies the at least one criterion, display a second content in place of the first content in a user interface of the client computer program, wherein the second content is different than the first content.

15. The computing device of claim 14, wherein the at least one criterion comprises a criterion that a video output of the computing device is operatively connected to a display device.

16. The computing device of claim 15, wherein the display device comprises a video projector.

17. The computing device of claim 14, wherein the at least one criterion comprises a criterion that the email message comprises a content containing one or more of a sender name, a sender domain, and a subject line.

18. A computer program product for displaying an email message, the computer program product comprising:
one or more computer-readable tangible storage devices;
program instructions, stored at least one of the one or more computer-readable tangible storage devices, to receive an input comprising at least one criterion for redacting email messages;
program instructions, stored at least one of the one or more computer-readable tangible storage devices, to store the at least one criterion in a configuration of a client computer program;
program instructions, stored at least one of the one or more computer-readable tangible storage devices, to receive an email message having a field, the field comprising a first content;
program instructions, stored at least one of the one or more computer-readable tangible storage devices, to determine whether a condition of at least one of the email message and a current state of a computing device satisfies the at least one criterion stored in the configuration of the client computer program; and
program instructions, stored at least one of the one or more computer-readable tangible storage devices, to, in response to determining that the condition satisfies the at least one criterion, display a second content in place of the first content in a user interface of the client computer program, wherein the second content is different than the first content.

19. The computer program product of claim 18, wherein the at least one criterion comprises a criterion that a video output of the computing device is operatively connected to a projector.

20. The computer program product of claim 18, wherein the at least one criterion comprises a criterion that the email message comprises a content containing one or more of a sender name, a sender domain, and a subject line.

* * * * *